Patented Aug. 13, 1929.

1,724,088

UNITED STATES PATENT OFFICE.

FELIX HOMBERG AND MAX LANDECKER, OF BARMEN, GERMANY, ASSIGNORS TO AMERICAN NUPLAX CORPORATION, OF NEW YORK, N. Y., A CORPORATION OF DELAWARE.

PROCESS FOR THE PRODUCTION OF COLORED MOLDED MASSES FROM BLOOD.

No Drawing. Application filed May 20, 1926, Serial No. 110,544, and in Germany July 7, 1925.

In patent application Serial No. 74,399 is described a process for the manufacture from blood of masses which may be dyed or bleached.

During the further course of work, it has been found that there are very particular groups of dyes which, when mixed with dry blood in the form of a lake, have the property, after the masses are molded under heat and pressure and then subjected to treatment with formaldehyde in solution, of giving to the mixture the color tone previously possessed by the dye.

The expression lake is the translation of the German term "Farblack." By this term is meant a colored powder which is generally produceed by precipitating an organic coloring matter from its solution, onto an inorganic powder, called the substratum, such for example, as lithopone, zinc white, chalk, green earth (glauconite, and also celadonite).

The dyes suitable for this purpose are of the class known as basic dyes, such as malachite green, methyl violet, etc. chrome dyes such as anthracene. An example will perhaps best explain the application of our invention.

Water soluble dry blood may be mixed for example, with 30 per cent by weight of a lake, which may be prepared from lithopone and ethyl green, in the respective proportions of 2000 to 10 by weight, and there is added about 15 per cent by weight of water, to facilitate molding. After mixing, the mass is pressed at 200 atmospheres, at a temperature of 85–105° C., for from 1½ to 2½ minutes, when there is obtained a dark brown mass, in which a color expert would probably detect a slight olive tone. If this plastic mass is now placed, for example, in a 15 per cent formaldehyde solution, the greenish blue color of the lake used, appears after a few hours, while the original brown tone disappears.

A further notable phenomenon is, that in weaker formaldehyde solutions, as for example, 8 per cent, a change of color takes place so that the greenish blue of the lake used becomes very prominent, but still is somewhat merged into the brownish tone of the coloring material of the blood.

By using solutions of formaldehyde of various concentrations, it is thus possible to obtain all color tones between that of the particular lake used and the natural color of the pressed and molded mass. The coloration penetrates to the interior of the mass under the action of the formalin, so that the object is colored as far as the formalin penetrates.

An addition of lesser quantities of a lake for example only 15 per cent by weight, to the water soluble dry blood, produces, with the stronger formalin concentration, instead of the pure color lake, mixtures thereof with the natural brown of the blood.

In every case, however, depending on the quantity of lake added, a color tone is always produced by formalin which differs from that of the pressed plastic mass, and assists the color tone of the added lake in breaking through and modifying the natural brown color.

According to the new process the procedure may be such that instead of the finished lake (such as lithopone and ethyl green as mentioned above) the substratum, lithopone, and the dissolved dye, for example ethyl green dissolved in the 15 per cent of water, may be added separately, as suggested in the second example below.

It will be understood therefore that the term lake in the appended claims covers the ingredients of a lake, whether the same are used together as a complete lake, or are used separately.

*Example 1.*

70 kgs. of water soluble dry blood were intimately mixed with 30 kgs. of lake consisting of lithopone and ethyl green (10 g. ethyl green deposited on 2000 g. lithopone), for a period of 5 hours, in a usual mixing drum. Then 15 per cent by weight, of water was added and the entire mixture was mixed for another 4 hours in the mixing drum.

The resulting powder was then filled into molds and pressed in hydraulic presses under 200 atmospheres pressure and at a temperature of 105° C. for 1½ minutes.

The molded article was then placed in a 20 per cent solution of formaldehyde for 6 hours. At the end of the 6 hours, the object showed a green color on the surface, and after a further treatment in the solution, of 42 hours, it became green throughout.

*Example 2.*

70 kgs. of water soluble dry blood were intimately mixed with 30 kgs. of lithopone for 5 hours in a usual mixing drum. After this time 15 per cent by weight of the above mixture of water, mixed with 30 gms. of methyl violet were added and the entire mixture was mixed for another 4 hours in the mixing drum.

The resulting powder was then filled into molds and pressed in hydraulic presses under 200 atmospheres pressure at a temperature of 105° C. for 1½ minutes.

Then the molded article was placed in a 20 per cent solution of formaldehyde, for 6 hours. After this time the object showed a violet color on the surface, and after a further 42 hour treatment in the formaldehyde solution, it became violet throughout.

What we claim is:—

A process for the production of colored masses from water soluble blood powder comprising mixing with the water soluble blood powder, a basic color lake, prepared with the so-called basic aniline dyes, pressing the mixture under heat to form a solid body, and then developing the color of the lake by immersing the formed body in a formaldehyde solution whereby the color of the basic color lake appears on the surface of this body, and in its interior as far as the formaldehyde solution penetrates.

In testimony whereof we have signed our names to this specification.

FELIX HOMBERG.
MAX LANDECKER.